F. STERN.
DISPLAY STAND FOR AUTOMOBILE TIRES.
APPLICATION FILED JAN. 31, 1920.
1,361,112. Patented Dec. 7, 1920.
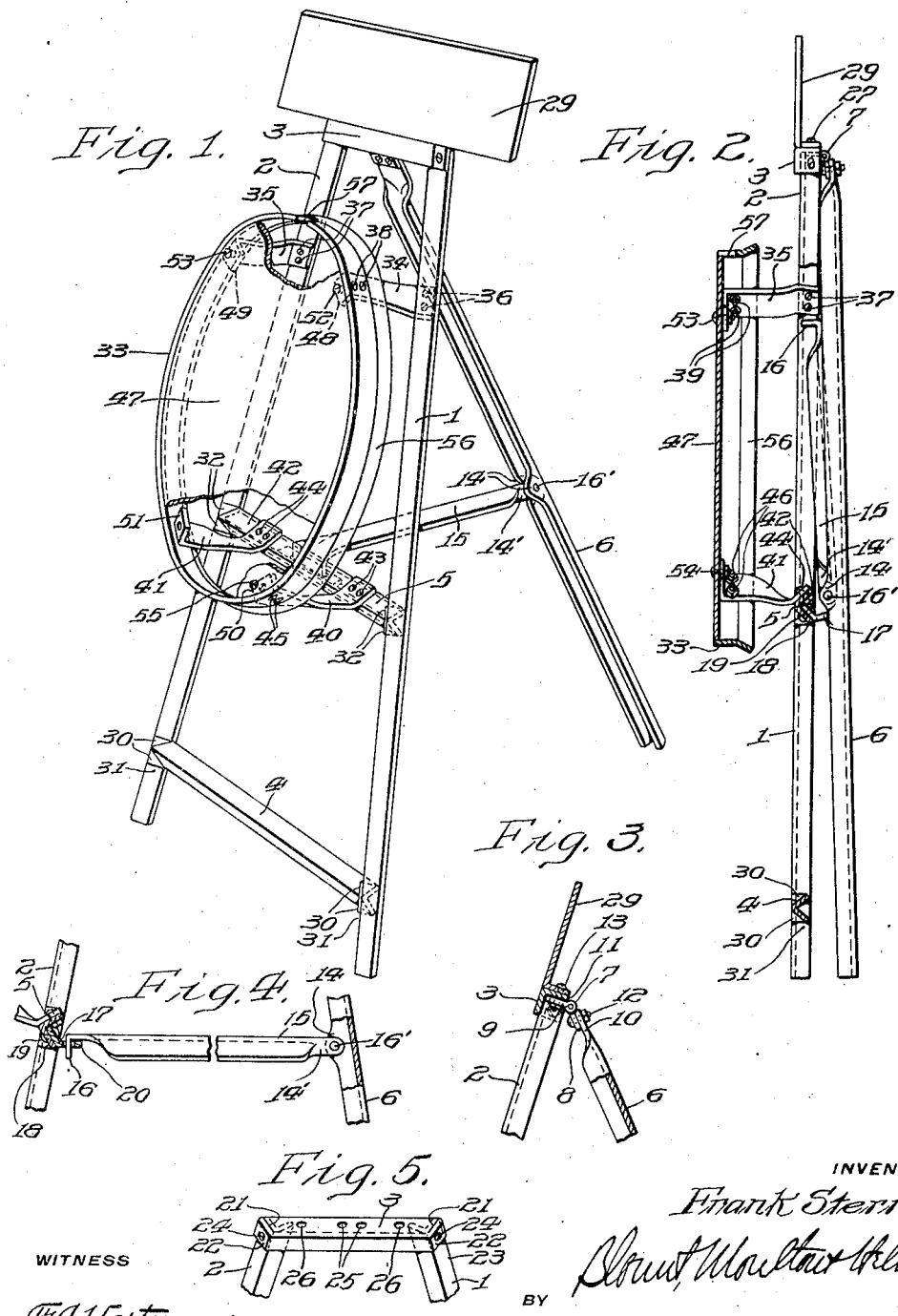
INVENTOR
Frank Stern.
WITNESS
ATTORNEYS

UNITED STATES PATENT OFFICE.

FRANK STERN, OF PHILADELPHIA, PENNSYLVANIA.

DISPLAY-STAND FOR AUTOMOBILE-TIRES.

1,361,112.     Specification of Letters Patent.     Patented Dec. 7, 1920.

Application filed January 31, 1920. Serial No. 355,336.

*To all whom it may concern:*

Be it known that I, FRANK STERN, a citizen of the United States, and a resident of the city of Philadelphia, county of Philadelphia, State of Pennsylvania, have invented certain new and useful Improvements in Display-Stands for Automobile-Tires, of which the following is a specification, reference being had to the accompanying drawing.

The invention relates to a new and useful stand for supporting automobile tires, preferably of the demountable type, for display.

One of the objects of my invention is to provide a display stand of the nature above referred to for prominently displaying any make of automobile tires in mounted position and in a convenient manner with advertising and descriptive matter whereby such tire and matter will be easy of inspection.

Another object of my invention is to provide such display stand with means whereby the same may be folded or collapsed into a comparatively small space for portability or storage.

A still further object is to make such device simple in construction, economical to manufacture, convenient in prominently displaying various makes and sizes of tires and occupying very little room or space.

My invention comprises such other objects, advantageous features and combination and arrangement of parts as will more fully hereinafter appear in the following specification and as are illustrated upon the accompanying drawing.

In the drawings wherein like reference characters are used to designate the same parts in the corresponding views;

Figure 1 is a perspective view of the stand in a position for displaying a tire, Fig. 2 is a transverse vertical section of the stand in closed or collapsed condition ready to be packed for shipment or for storing, Figs. 3, 4 and 5 are fragmentary details of various parts thereof.

Referring now more particularly to the drawing, the stand comprises front frame members 1 and 2, disposed in upwardly converging relation, connected at the upper end thereof by a relatively short cross piece 3 and near the lower end thereof by a relatively long cross piece 4, an intermediate cross piece 5 being connected to the side pieces 1 and 2 intermediate the pieces 3 and 4. To the upper cross piece 3 and at the rear thereof may be secured a leg 6 provided with a hinge member 7 at the upper end thereof. It will be observed that the members 1, 2, 3, 4, 5 and 6 are preferably constructed of angle iron of the right angle form and are suitably pressed or otherwise shaped to provide means for connecting the various parts together, as is illustrated upon the drawing. The hinge member comprises relatively movable portions 8 and 9 respectively secured to the flattened portion 10 provided at the upper end of the leg 6 and the flange 11 of the cross member 3 by means of screw bolts 12 and 13 or similar appropriate securing members. Intermediate the ends of the leg 6 may be provided pressed or bent ear portions 14 between which the flattened end 14' of the hook member 15 is adapted to be located and pivotally connected to the leg 6 by means of the pivot pin 16'. The free end of the hook member 15 is suitably flattened and bent in the form of a hook 16 adapted to connect with the cross member 5. The member 15 is also preferably formed of angle iron and is so disposed with relation to the leg 6 that when the hook member 15 is raised into the position shown in Fig. 2 the ridge of the member 15 is adapted to partly nest within the angular space of the leg 6 above the ears 14 in order that the latter may be brought into close proximity to the front part of the stand comprising the cross members 3, 4 and 5.

For the purpose of connecting the hook 16 to the cross member 5 the latter may be provided with a slotted plate 17 suitably secured to the lower flange 18 of the member 5 by means of rivets 19 or other suitable attaching devices. The slot of the plate 17 is provided in the extension 20 of said plate which projects rearwardly from the flange 18 a suitable distance for the convenient insertion of the hook 16 into the slot thereof, as clearly appears in Fig. 4 of the drawing.

At the upper end of the stand the cross member 3, which may be of angle iron, is suitably provided with slots or cut out portions 21 whereby the ends 22 may be suitably bent to closely fit with a neat appearance around the ends of the members 1 and 2 over the flanges 23 thereof and rigidly secured to the latter by screw bolts 24, or other suitable securing elements, passing through the members 22 and the flanges 23.

The upper flange 11 of the cross member 3 may be provided with a suitable number of perforations 25 and 26 in the former of which the screw bolts 13 may be inserted for securing the hinge 7 to the flange 11 in the latter of which may be inserted screw bolts 27 or the like for securing the lower flange 28 of a sign or display member 29.

The cross members 4 and 5 may be suitably provided at the ends thereof with portions 30 and 32 appropriately bent to register with the faces of the inner flanges 31 of the members 1 and 2 for securement thereto, such members being secured in any appropriate manner as by rivets, bolts or by spot welding.

The tire and its demountable rim may be placed upon the rim 33 supported upon the bracket members 34 and 35 attached respectively to the members 1 and 2. The bracket members are preferably made of flat pieces of metal with an end thereof secured to the flange 31 of the members 1 and 2 by any suitable securing means, such as screw bolts 36 and 37, and are suitably bent or twisted to engage at the other end thereof with the inner surface of the rim 33 and to be secured thereto by any appropriate securing elements, such as screw bolts 38 and 39 or the like. Similarly, at the lower portion of the rim 33 may be provided supporting brackets 40 and 41 secured at an end thereof to the upper flange 42 of the cross piece 5, as by means of screw bolts 43 and 44 or other suitable securing means, and bent or twisted at the other ends thereof to contact with the inner surface of the rim 33 for securement thereto by any suitable securing means, such as screw bolts 45 and 46. By the provision of these members, for supporting the rim 33, a rigid and strong support is provided for the tire and its rim.

Within the rim 33 may be located a display sign in the form of a substantially circular plate 47. This plate may be secured to the ends of the bracket members 34, 35, 40 and 41. For this purpose the ends of said brackets may be provided with inwardly directed flanges 48, 49, 50 and 51 respectively each provided with a perforation through which screw bolts 52, 53, 54 and 55 may be inserted for the purpose of securing the plate 47 to said flanges. The front surface of the plate is preferably located in a plane substantially coincident with the front edge of the rim 33. The rear portion of the rim 33 may be provided with a flared portion 56 against which the rear of the demountable rim may abut for properly positioning the tire upon the rim 33 when mounted for display.

The parts are herein disclosed as preferably connected together by screw bolts inasmuch as such securing means may be readily disconnected for the interchange or replacement of parts. When it is desired to change a part, as for example when tires of different sizes are to be mounted for display, a larger rim 33 may be utilized and suitable brackets for supporting the same attached to the members 1 and 2, for the particular size of rim used, in a manner similar to that described above for the bracket members 34, 35, 40 and 41. In this way the display rack may be regarded as adjustable to different sizes of tires to be displayed.

At the upper portion of the rim 33 may be provided a slot 57 through which the air-valve nipple of the tire is adapted to be located without interfering with the proper positioning of the tire and its rim upon the rim 33.

When it is desired to transport the display stand or to pack the same for shipment or storage it is only necessary to disengage the hook 16 from the slotted portion 20 and to locate the same within the angular space of the leg 6 where it may be secured thereto by any suitable means. If necessary, to gain more space, the bracket members also may be detached from the members 1, 2, 5 and 33 and, with the rim 33, tied to the members 1 and 2 in any appropriate manner.

While I have herein described one form of my invention I do not wish it to be understood that the same is to be limited to the particular details described in the specification and shown upon the drawing but that the same comprehends such other devices as may come within the spirit of my invention and the scope of the appended claim.

Having thus described my invention, what I claim and desire to protect by Letters Patent of the United States is:

In a stand for displaying automobile tires, the combination of a frame comprising side bars, top, intermediate and bottom cross bars rigidly secured to said side bars, a flange on said top cross bar, a hinge secured to said flange, a leg secured to said hinge and adapted to swing thereby relative to said frame, a connecting member pivotally connected to said leg and provided with a hook at the free end thereof for detachable connection with said frame, a slotted member rigidly secured to said intermediate cross member and extending laterally therefrom, said hook adapted to engage said member in the slot thereof, means rigidly secured to said frame and projecting forwardly thereof for supporting a rim, and a rim secured to said means and adapted to support a tire in displaying position.

In witness whereof I have hereunto set my hand this thirtieth day of January, 1920.

FRANK STERN.